(12) United States Patent
Allgeier

(10) Patent No.: US 11,980,145 B2
(45) Date of Patent: May 14, 2024

(54) DRIVE ASSEMBLY FOR ROTATING A GROW TOWER IN AN INDOOR GARDEN CENTER

(71) Applicant: Haier US Appliance Solutions, Inc., Wilmington, DE (US)

(72) Inventor: Brian Allgeier, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 188 days.

(21) Appl. No.: 16/950,401

(22) Filed: Nov. 17, 2020

(65) Prior Publication Data
US 2022/0151162 A1  May 19, 2022

(51) Int. Cl.
| | |
|---|---|
| *A01G 9/02* | (2018.01) |
| *A01G 7/04* | (2006.01) |
| *A01G 9/14* | (2006.01) |
| *A01G 9/24* | (2006.01) |
| *A47B 49/00* | (2006.01) |

(52) U.S. Cl.
CPC ............... *A01G 9/023* (2013.01); *A01G 9/14* (2013.01); *A01G 9/246* (2013.01); *A01G 9/247* (2013.01); *A01G 9/249* (2019.05); *A47B 49/004* (2013.01); *A47B 49/008* (2013.01); *A01G 7/045* (2013.01)

(58) Field of Classification Search
CPC .......... A01G 9/023; A01G 9/14; A01G 9/246; A01G 9/247; A01G 9/249; A01G 9/00; A01G 7/045; A01G 27/00; A47B 49/004; A47B 49/008; A47F 7/0078
See application file for complete search history.

(56) References Cited

U.S. PATENT DOCUMENTS

| | | | | |
|---|---|---|---|---|
| 991,541 | A * | 5/1911 | Rapoport ............. | A47B 49/004 312/305 |
| 1,828,370 | A * | 10/1931 | Edwin ..................... | F16D 7/044 464/39 |
| 2,310,718 | A * | 2/1943 | Teach ...................... | A47F 5/025 362/125 |
| 2,680,668 | A * | 6/1954 | Stanfiel ................. | F25D 25/027 211/144 |
| 2,759,611 | A * | 8/1956 | Lee ......................... | A47F 5/025 211/144 |
| 2,762,513 | A * | 9/1956 | Zaninovich ............. | A47F 5/025 211/144 |

(Continued)

FOREIGN PATENT DOCUMENTS

| | | | | |
|---|---|---|---|---|
| CA | 2359920 A1 * | 1/2002 | ............. | A01G 31/02 |
| CN | 109105245 A | 1/2019 | | |

(Continued)

*Primary Examiner* — Stanton L Krycinski
(74) *Attorney, Agent, or Firm* — Dority & Manning, P.A.

(57) ABSTRACT

An indoor gardening appliance includes a liner defining a grow chamber and a grow module rotatably mounted within the grow chamber for receiving a plurality of plant pods. A drive assembly is provided for selectively rotating the grow module within the grow chamber, and includes a turntable assembly configured for receiving the grow module, a bi-directional motor assembly, and a clutch assembly mechanically coupling the motor assembly and the turntable assembly, the clutch assembly having a torque slip threshold beyond which the clutch assembly disengages the motor assembly from the turntable assembly.

18 Claims, 13 Drawing Sheets

(56) References Cited

U.S. PATENT DOCUMENTS

| | | | | |
|---|---|---|---|---|
| 3,841,023 | A | * | 10/1974 | Carlyon, Jr. .......... A01G 9/023 47/16 |
| 3,882,634 | A | | 5/1975 | Dedolph |
| 4,236,769 | A | * | 12/1980 | Mueller .................. A47F 5/025 211/144 |
| 4,250,666 | A | * | 2/1981 | Rakestraw ............ A01G 9/023 47/DIG. 6 |
| 5,241,781 | A | * | 9/1993 | Malczyk ................ A01G 9/16 47/60 |
| 5,304,110 | A | * | 4/1994 | Obrist ................ B23Q 3/15539 211/1.55 |
| 5,438,797 | A | * | 8/1995 | Lendel .................. A01G 9/023 47/82 |
| 5,546,629 | A | * | 8/1996 | Shim ...................... A63B 47/04 15/21.2 |
| 6,308,816 | B1 | * | 10/2001 | Bankuty .............. B67C 7/0006 198/395 |
| 7,055,282 | B2 | | 6/2006 | Bryan, III ............. A01G 9/022 47/62 R |
| 8,484,890 | B2 | * | 7/2013 | Simmons .............. A01G 31/06 47/62 A |
| 8,925,346 | B2 | * | 1/2015 | Natarajan ............... F25D 11/04 62/251 |
| 9,022,236 | B1 | | 5/2015 | Amendolea ........... B65G 1/045 211/144 |
| 9,364,082 | B2 | * | 6/2016 | Hayami ................ H02K 49/108 |
| 9,591,814 | B2 | * | 3/2017 | Collins .................. A01G 31/02 |
| 9,918,436 | B2 | * | 3/2018 | Cudmore ................ C05F 17/964 |
| 9,936,805 | B2 | * | 4/2018 | McGregor ................ A47F 5/02 |
| 9,974,243 | B2 | | 5/2018 | Martin |
| 10,086,774 | B2 | * | 10/2018 | Hawkins .............. A47B 49/004 |
| 11,147,395 | B2 | * | 10/2021 | Hunter .................... A01G 9/249 |
| 11,206,774 | B2 | * | 12/2021 | Sperry .................... A01G 7/045 |
| 11,240,974 | B2 | * | 2/2022 | Hunter .................... A01G 9/249 |
| 11,452,265 | B2 | * | 9/2022 | Tompkin ................ A01G 7/045 |
| 11,457,571 | B2 | * | 10/2022 | Waymeyer ............. A01G 9/246 |
| 11,503,774 | B2 | * | 11/2022 | Wantland ............... A01G 7/045 |
| 2006/0137375 | A1 | * | 6/2006 | Lishman ................. F25D 23/10 62/258 |
| 2010/0132255 | A1 | * | 6/2010 | Webber .................. A01G 9/023 47/29.1 |
| 2017/0265408 | A1 | | 9/2017 | McGowan et al. |
| 2018/0007845 | A1 | * | 1/2018 | Martin ................ A01G 31/047 |
| 2020/0037514 | A1 | * | 2/2020 | Massey ...................... A01G 9/24 |
| 2020/0037526 | A1 | * | 2/2020 | Sperry .................... A01G 9/025 |
| 2020/0236864 | A1 | * | 7/2020 | Henry .................... A01G 27/003 |
| 2021/0176935 | A1 | * | 6/2021 | Massey ................ A01G 31/047 |
| 2022/0192114 | A1 | * | 6/2022 | Lee ...................... A01G 31/047 |

FOREIGN PATENT DOCUMENTS

| | | | | |
|---|---|---|---|---|
| DE | 3427450 C2 | | 6/1989 | |
| FR | 2520972 A1 | * | 8/1983 | |
| FR | 2743257 A1 | * | 7/1997 | .......... A01G 27/001 |
| GB | 2548591 A | * | 9/2017 | .......... A47B 49/004 |
| KR | 100788273 B1 | * | 12/2007 | |
| KR | 200453179 Y1 | | 4/2011 | |
| KR | 101127310 B1 | * | 3/2012 | |
| KR | 101338853 B1 | * | 12/2013 | |
| KR | 20140021025 A | * | 2/2014 | |
| WO | WO-2008066289 A1 | * | 6/2008 | .......... A01G 27/00 |
| WO | WO-2016164652 A1 | * | 10/2016 | .......... A01G 31/00 |

* cited by examiner

DRIVE ASSEMBLY FOR ROTATING A GROW TOWER IN AN INDOOR GARDEN CENTER

FIELD OF THE INVENTION

The present subject matter relates generally to systems for gardening plants indoors, and more particularly, to drive assemblies for rotating a grow module or tower in an indoor gardening appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Certain indoor gardening appliances include a grow tower that includes features for supporting a plurality of plants. This grow tower may be a large, rotating structure that is primarily supported from a single motor shaft centered below the tower and driven by a drive motor. Notably, this motor must be capable of providing significant torque to rotate the tower and plants located therein. However, this torque may frequently generate dangerous operating condition, e.g., such as dangers related to potential pinch points between the grow tower and cabinet. Furthermore, these motors are typically positioned at a bottom of the grow chamber and are thus exposed to plant runoff and contamination.

Accordingly, an improved indoor garden center would be useful. More particularly, an indoor garden center with an improved drive assembly that addresses one or more of the issues described above would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance is provided including a liner positioned within a cabinet and defining a grow chamber, a grow module mounted within the liner and defining a plurality of apertures for receiving one or more plant pods, and a drive assembly for selectively rotating the grow module within the grow chamber. The drive assembly includes a turntable assembly configured for receiving the grow module, a motor assembly, and a clutch assembly mechanically coupling the motor assembly and the turntable assembly, the clutch assembly having a torque slip threshold beyond which the clutch assembly disengages the motor assembly from the turntable assembly.

In another exemplary embodiment, a drive assembly for selectively rotating a grow module within a grow chamber of a gardening appliance is provided. The drive assembly includes a turntable assembly configured for receiving the grow module, a motor assembly, and a clutch assembly mechanically coupling the motor assembly and the turntable assembly, the clutch assembly having a torque slip threshold beyond which the clutch assembly disengages the motor assembly from the turntable assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
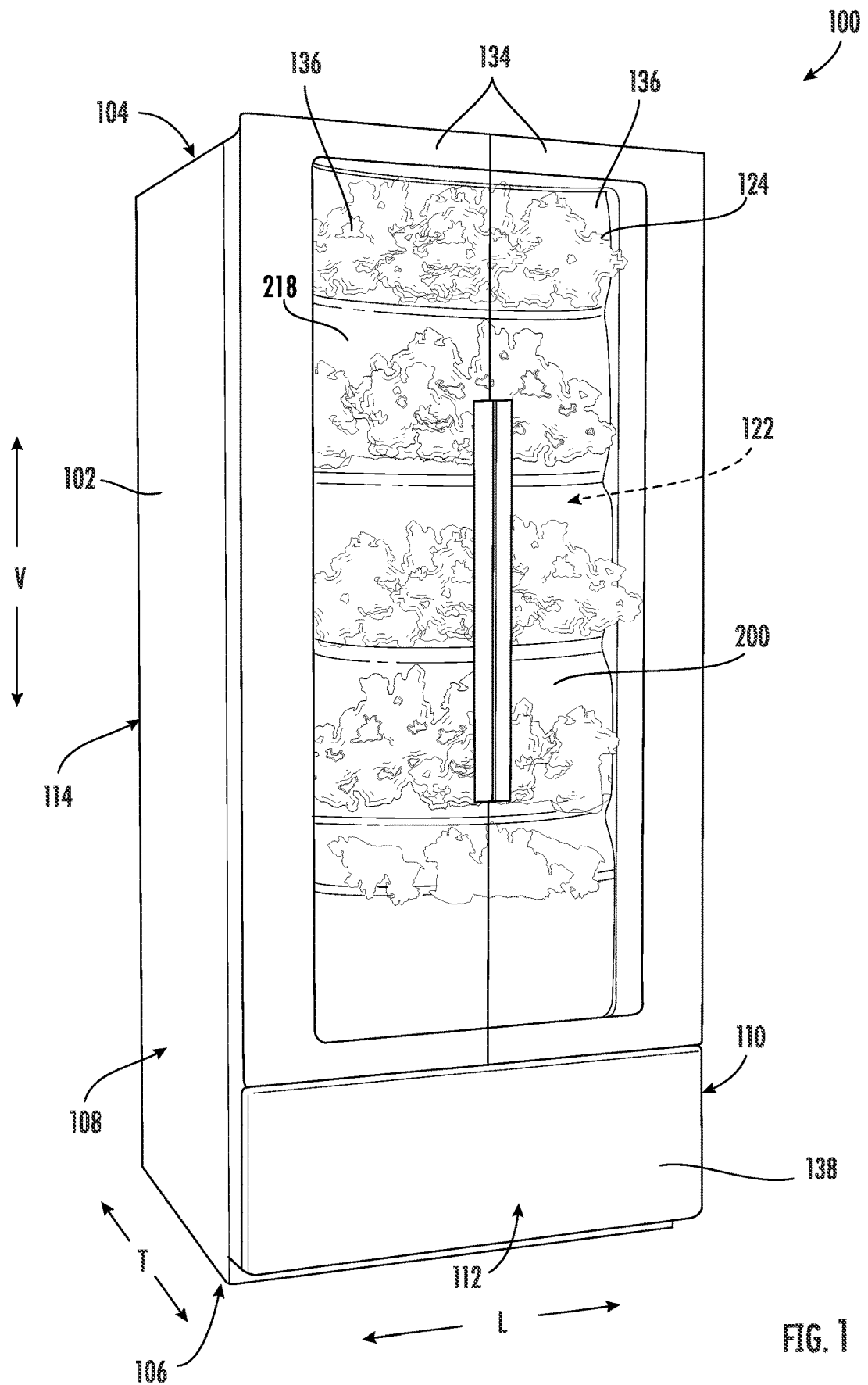
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Figure 2:
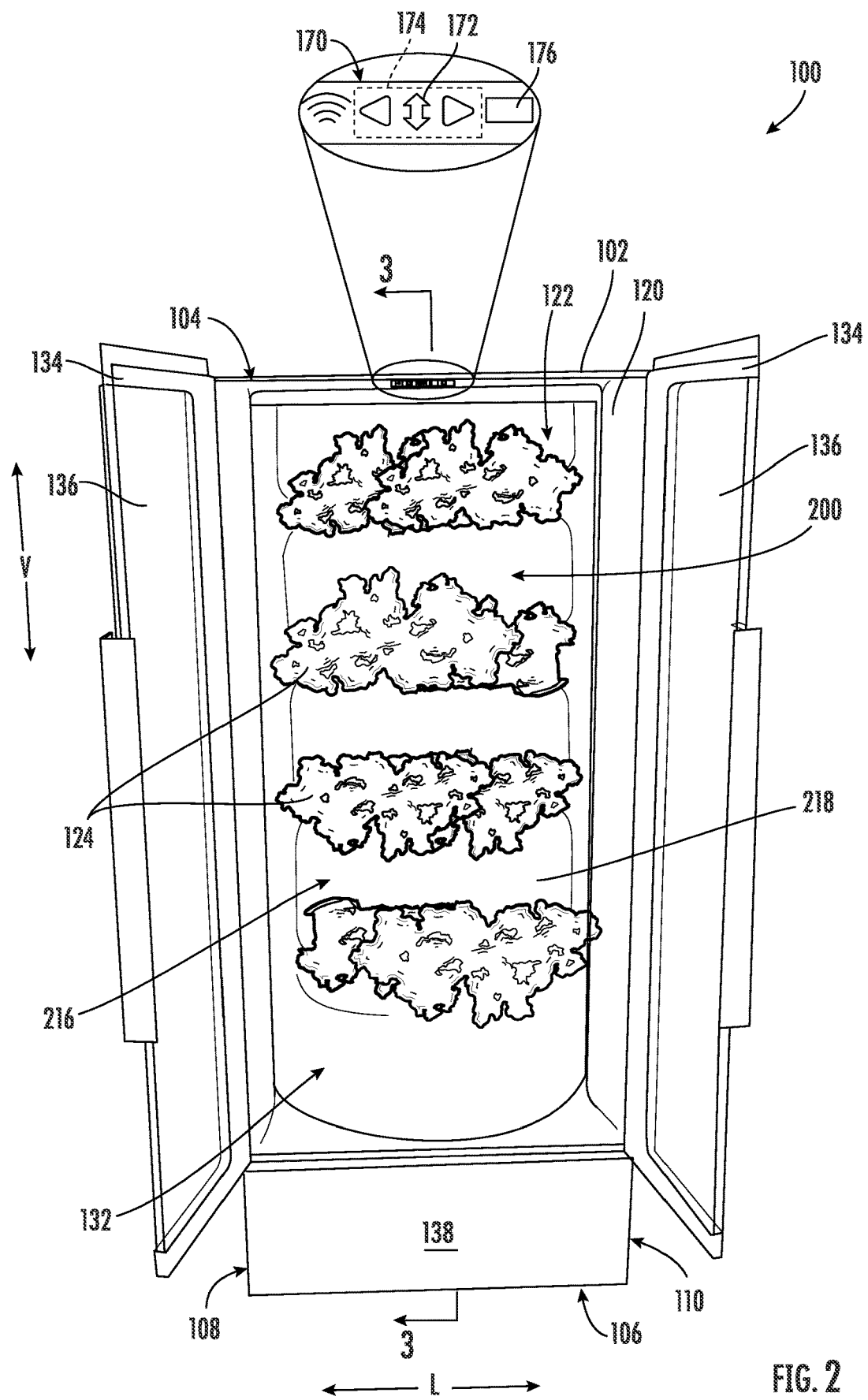
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
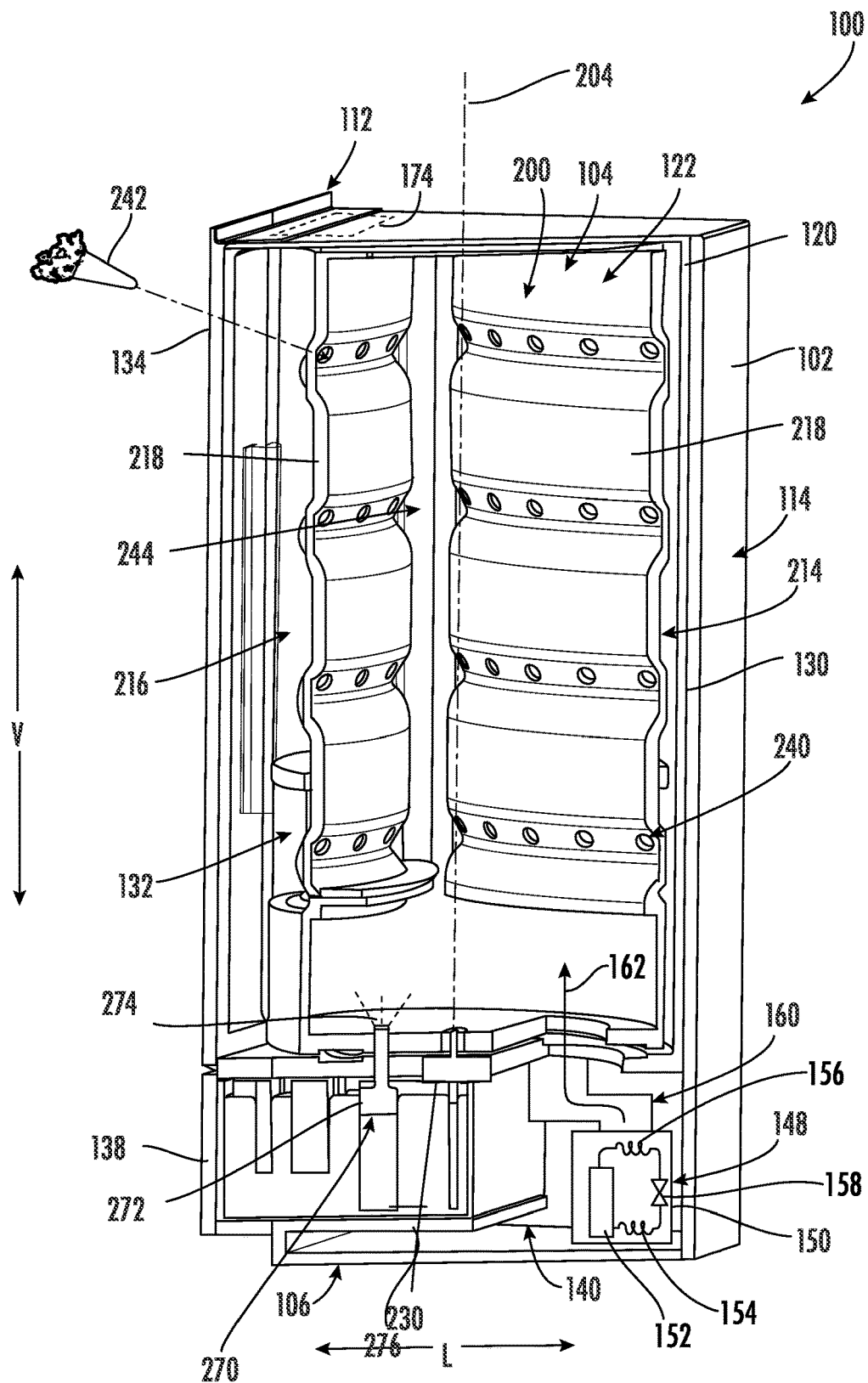
FIG. 3 is a cross sectional view of the exemplary gardening appliance of FIG. 1, taken along Line 3-3 from FIG. 2 with an internal divider removed for clarity.

FIG. 3 provides a schematic view of certain components of an environmental control system 148 that may be used to regulate a temperature within grow chamber 122. Specifically, environmental control system 148 may include a sealed system 150, a duct system 160, and a hydration system 270, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 4:
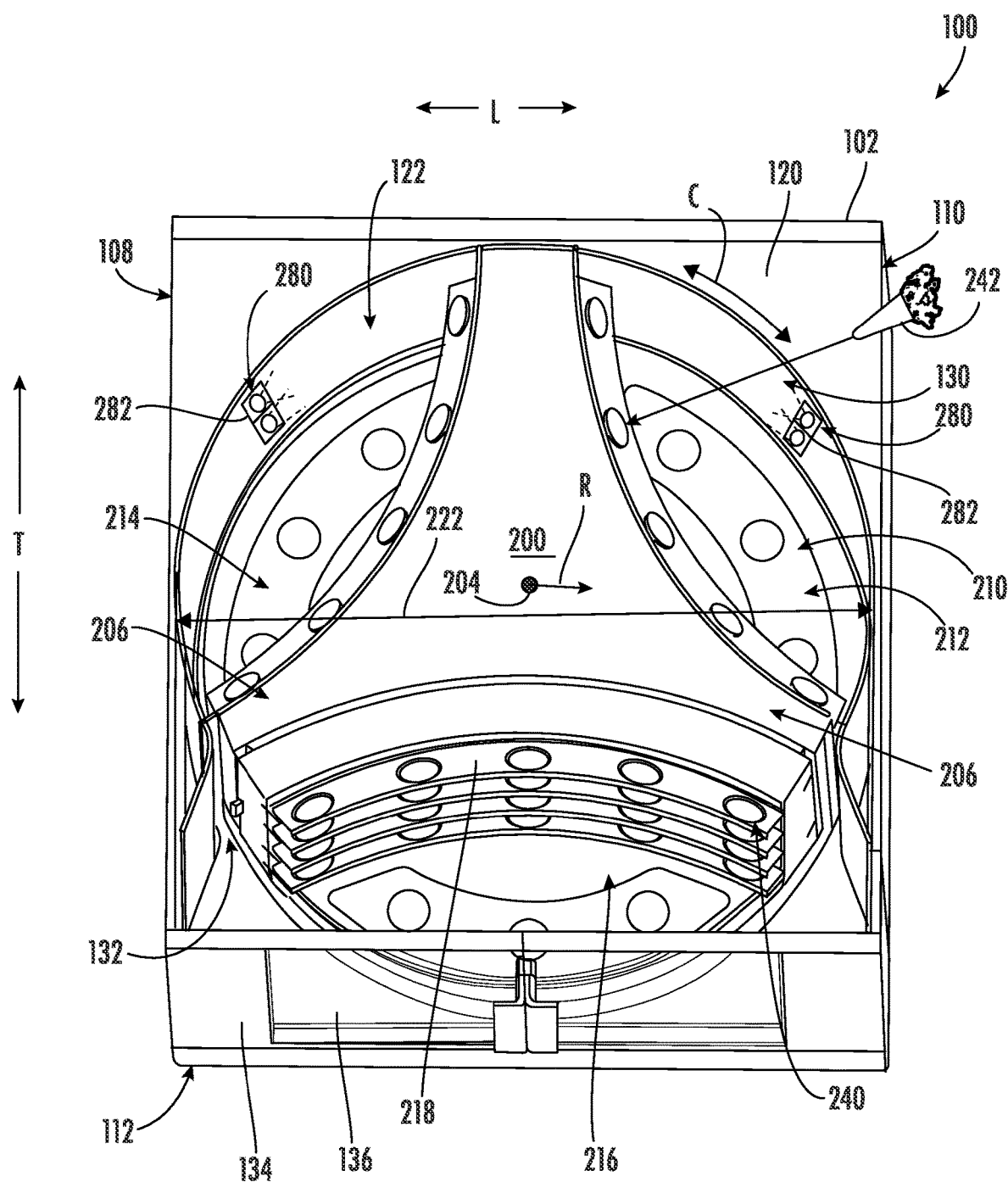
FIG. 4 is a top perspective view of the exemplary gardening appliance of FIG. 1, with the top panel of the cabinet removed to reveal a rotatable grow module according to an exemplary embodiment of the present subject matter.
Figure 5:
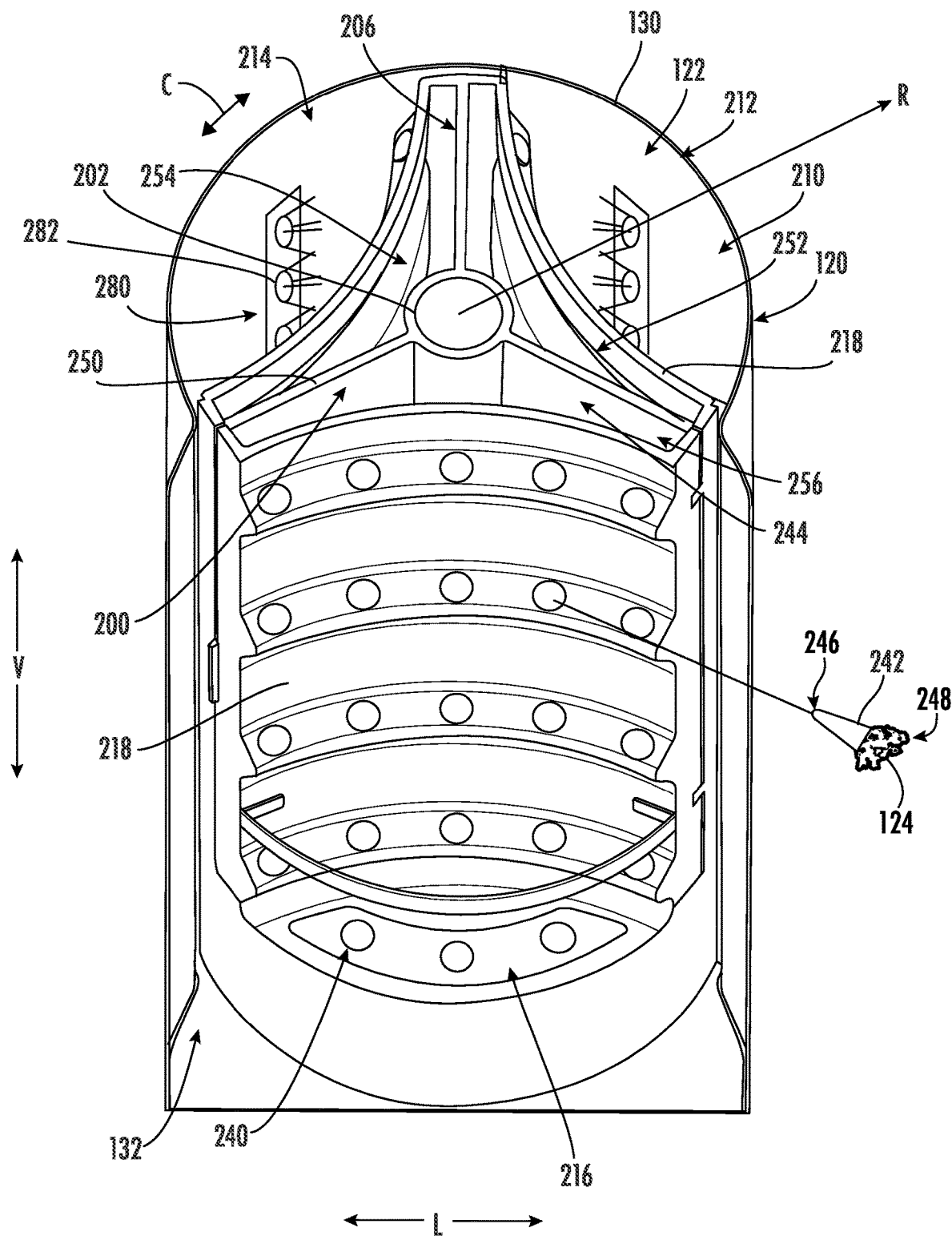
FIG. 5 provides a perspective cross sectional view of the exemplary gardening appliance of FIG. 1 according to another exemplary embodiment of the present subject matter.
Figure 6:
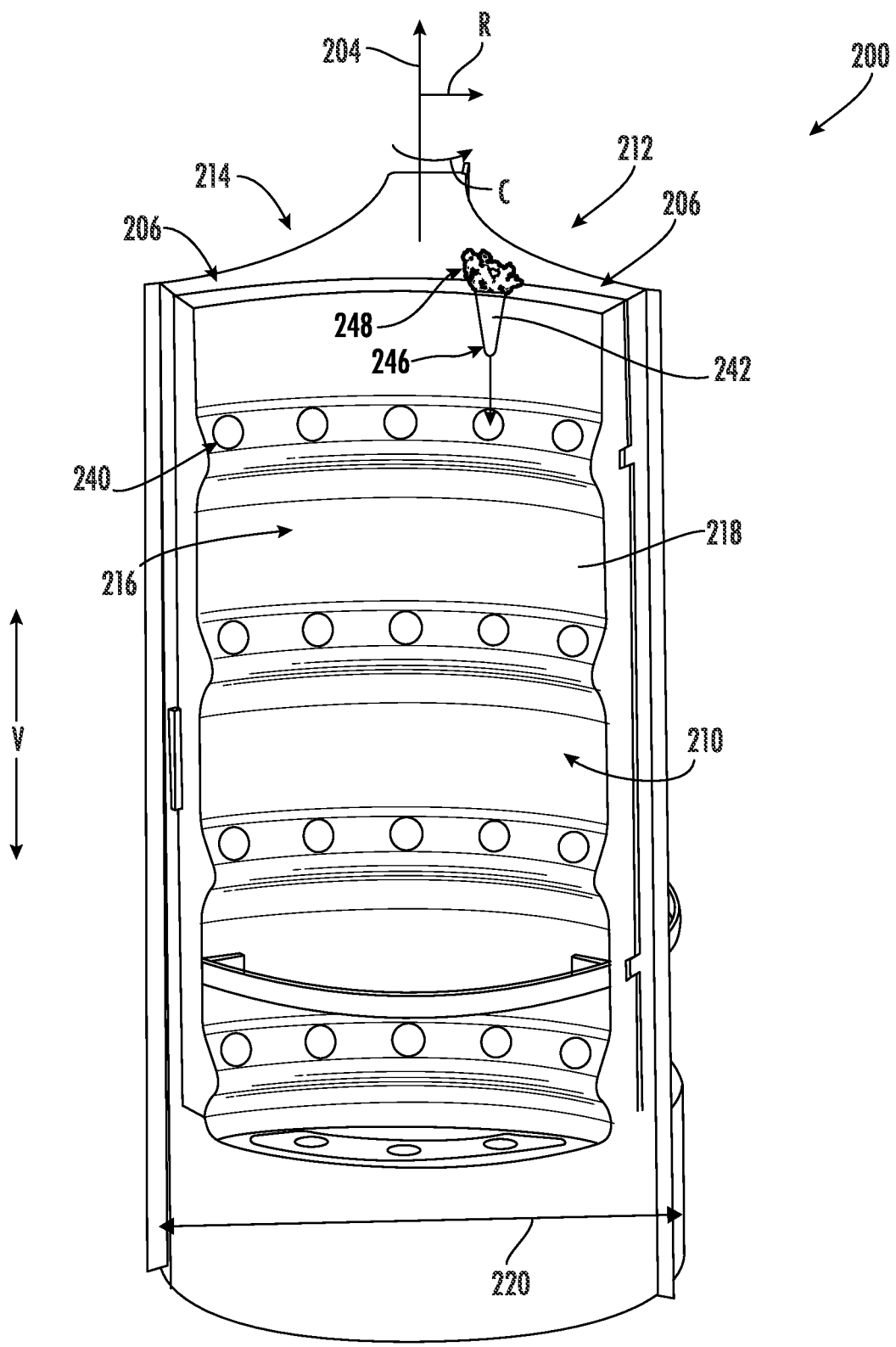
FIG. 6 provides a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into root chamber 244. A plant end 248 of the plant pod 242 may remain within grow chamber 210 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, apertures 240 may be covered by a flat flapper seal (not shown) to prevent water from escaping root chamber 244 when no plant pod 242 is installed.

Figure 7:
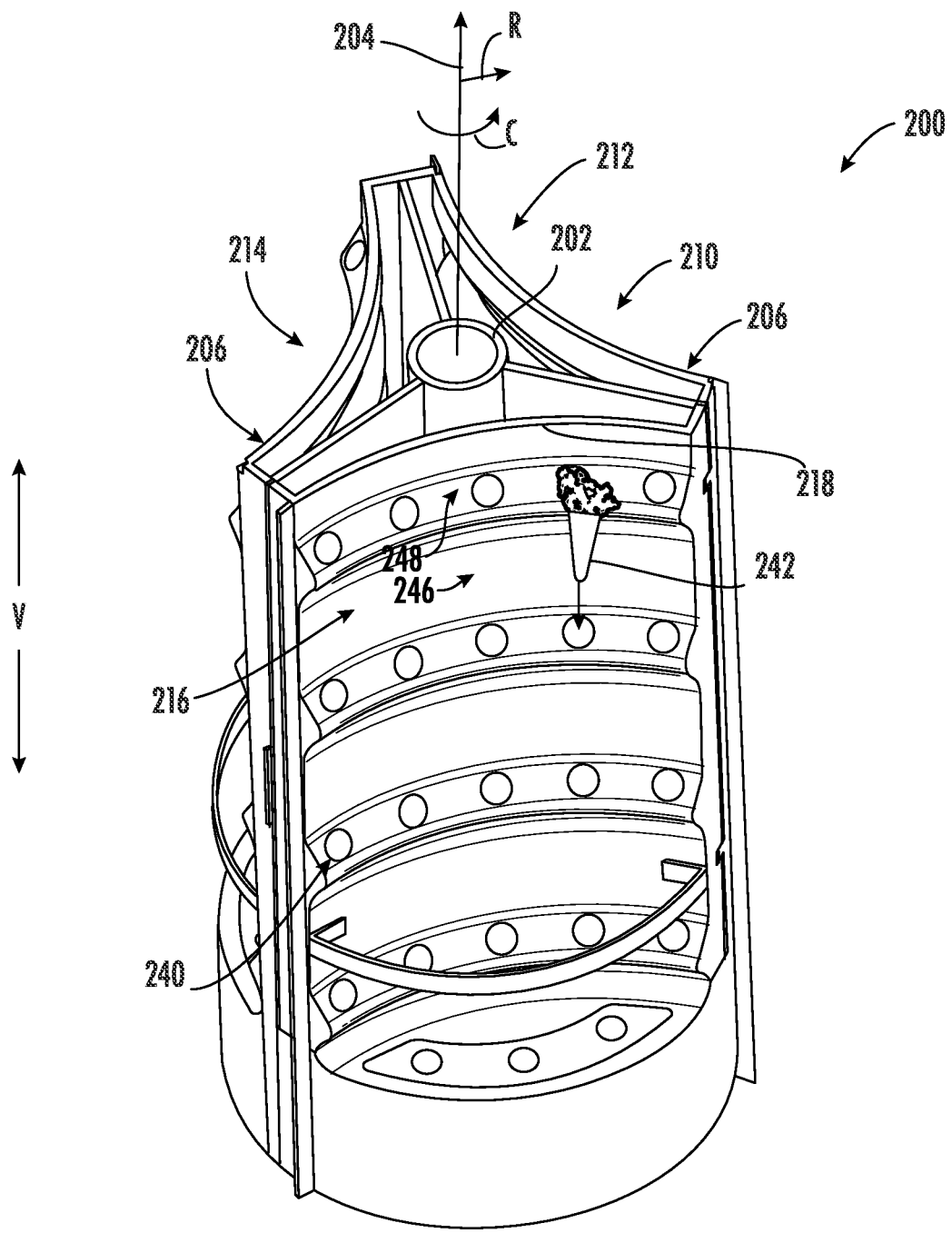
FIG. 7 provides a perspective cross sectional view of the exemplary grow module of FIG. 6 according to another exemplary embodiment of the present subject matter.
Figure 8:
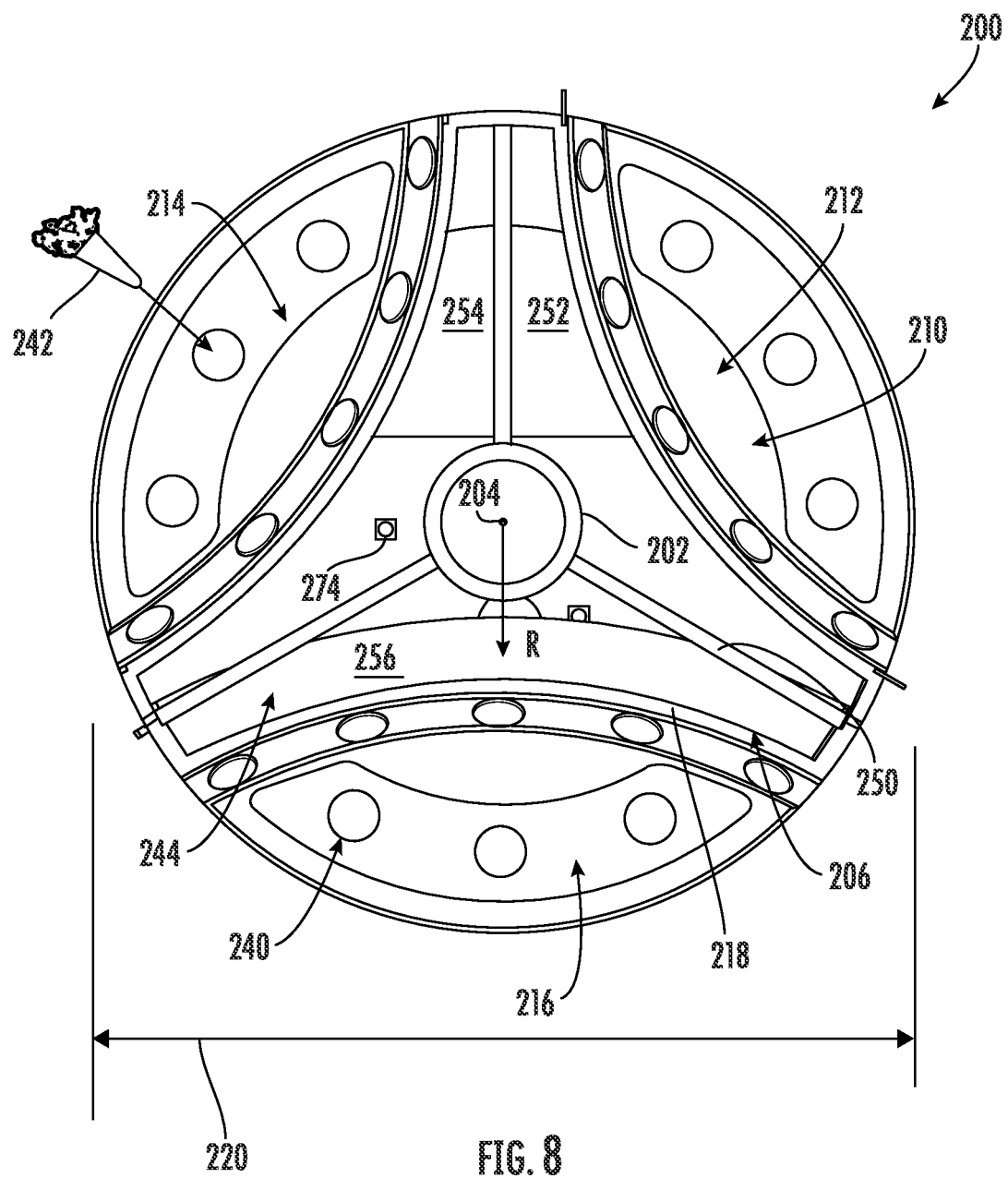
FIG. 8 provides a top cross-sectional view of the exemplary grow module of FIG. 6 according to another exemplary embodiment of the present subject matter.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality of root chambers 252-256 independently of each other.

Environmental control system 148 may further include a hydration system 270 which is generally configured for providing water to plants 124 to support their growth. Specifically, according to the illustrated embodiment, hydration system 270 generally includes a water supply 272 and misting device 274 (e.g., such as a fine mist spray nozzle or nozzles). For example, water supply 272 may be a reservoir containing water (e.g., distilled water) or may be a direct connection municipal water supply. According to exemplary embodiments, hydration system 270 may include one or more pumps 276 (see FIG. 15) for providing a flow of liquid nutrients to misting device 274. In this regard, for example, water or nutrients that are not absorbed by roots of plants 124 may fall under the force of gravity into a sump 278. Pump 276 may be fluidly coupled to sump 278 to recirculate the water through misting device 274.

Misting device 274 may be positioned at a bottom of root chamber 244 and may be configured for charging root chamber 244 with mist for hydrating the roots of plants 124. Alternatively, misting devices 274 may pass through central hub 204 along the vertical direction V and periodically include a nozzle for spraying a mist or water into root chamber 244. Because various plants 124 may require different amounts of water for desired growth, hydration system 270 may alternatively include a plurality of misting devices 274, e.g., all coupled to water supply 272, but being selectively operated to charge each of first root chamber 252, second root chamber 254, and third root chamber 256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

Referring now for example to FIGS. 4 and 5, gardening appliance 100 may further include a light assembly 280 which is generally configured for providing light into selected grow chambers 210 to facilitate photosynthesis and growth of plants 124. As shown, light assembly 280 may include a plurality of light sources 282 stacked in an array, e.g., extending along the vertical direction V. For example, light sources 282 may be mounted directly to liner 120 within grow chamber 122, or may alternatively be positioned behind liner 120 such that light is projected through a transparent window or light pipe into grow chamber 122. The position, configuration, and type of light sources 282 described herein are not intended to limit the scope of the present subject matter in any manner.

Light sources 282 may be provided as any suitable number, type, position, and configuration of electrical light source(s), using any suitable light technology and illuminating in any suitable color. For example, according to the illustrated embodiment, light source 282 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 282 may include any other suitable traditional light bulbs or sources, such as halogen bulbs, fluorescent bulbs, incandescent bulbs, glow bars, a fiber light source, etc.

Notably, light sources 282 may generate a considerable amount of heat during operation. As a result, it may be desirable that gardening appliance 100 include systems for cooling light assembly 280. Referring briefly to FIGS. 9 through 14, gardening appliance 100 may include a light cooling duct 284 and a cooling fan 286 for urging a flow of cooling air through the light cooling duct 284 to cool light sources 282. For example, each light assembly (e.g., in first chamber 212 and second chamber 214) may include a separate light cooling duct 284 within which the control electronics or a portion of light sources 282 may be positioned. In this manner, cooling fans 286 may be selectively operated to urge a flow of cooling air from their respective grow chambers 212, 214 over light sources 282 to maintain suitable operating temperature.

As explained above, light generated from light assembly 280 may result in light pollution within a room where gardening appliance 100 is located. Therefore, aspects of the present subject matter are directed to features for reducing light pollution, or to the blocking of light from light sources 282 through front display opening 132. Specifically, as illustrated, light assembly 280 is positioned only within the enclosed back portion 130 of liner 120 such that only grow chambers 210 which are in a sealed position are exposed to light from light sources 282. Specifically, grow module 200 acts as a physical partition between light assemblies 280 and front display opening 132. In this manner, as illustrated in FIG. 5, no light may pass from first chamber 212 or second chamber 214 through grow module 200 and out front display opening 132. As grow module 200 rotates, two of the three grow chambers 210 will receive light from light assembly 280 at a time. According still other embodiments, a single light assembly may be used to reduce costs, whereby only a single grow chamber 210 will be lit at a single time.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 206, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow module 200 but may have a modified cabinet 102 such that front display opening 132 is wider and two of the three grow chambers 210 are displayed at a single time. Thus, first chamber 212 may be in the sealed position, while second chamber 214 and third chamber 216 may be in the display positions. As grow module 200 is rotated counterclockwise, first chamber 212 is moved into the display position and third chamber 216 is moved into the sealed position.

Referring now to FIGS. 9 through 12, a drive assembly 300 will be described according to an exemplary embodiment of the present subject matter. Specifically, drive assembly 300 is generally positioned within gardening appliance 100 and is operably coupled to grow module 200 for selectively rotating grow module within grow chamber 122. Although an exemplary embodiment of drive assembly 300 is described below as being used rotate grow module 200 within gardening appliance 100, it should be appreciated that variations and modifications may be made to drive assembly 300 while remaining within the scope of the present subject matter. In addition, it should be appreciated that drive assembly 300 is not limited to the application described herein. Indeed, drive assembly 300 may be used rotate any grow module within any gardening appliance.

Figure 9:
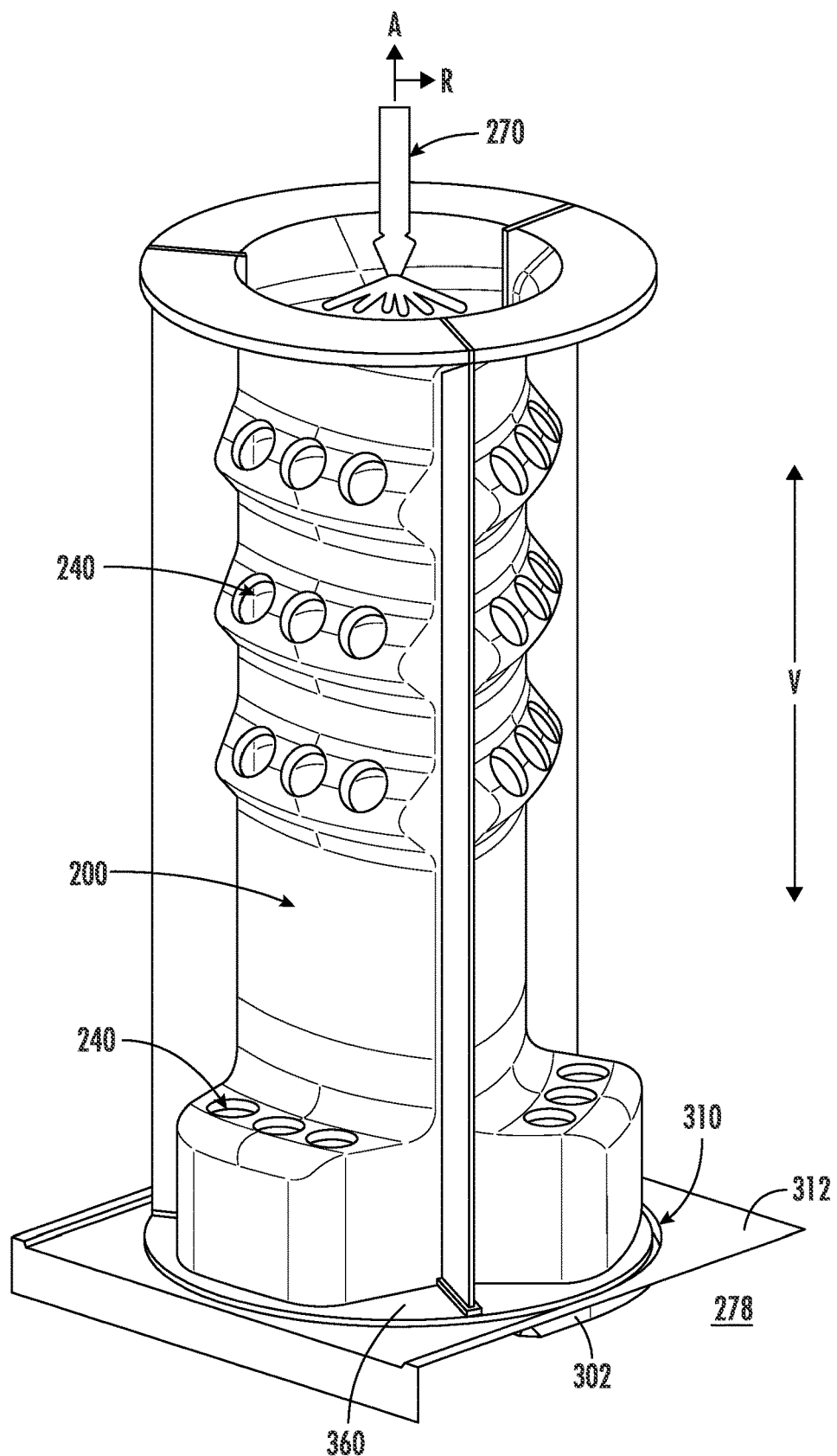
FIG. 9 provides a perspective view of a grow module and a drive assembly that may be used with the exemplary gardening appliance of FIG. 1 according to an exemplary embodiment of the present subject matter.
Figure 12:
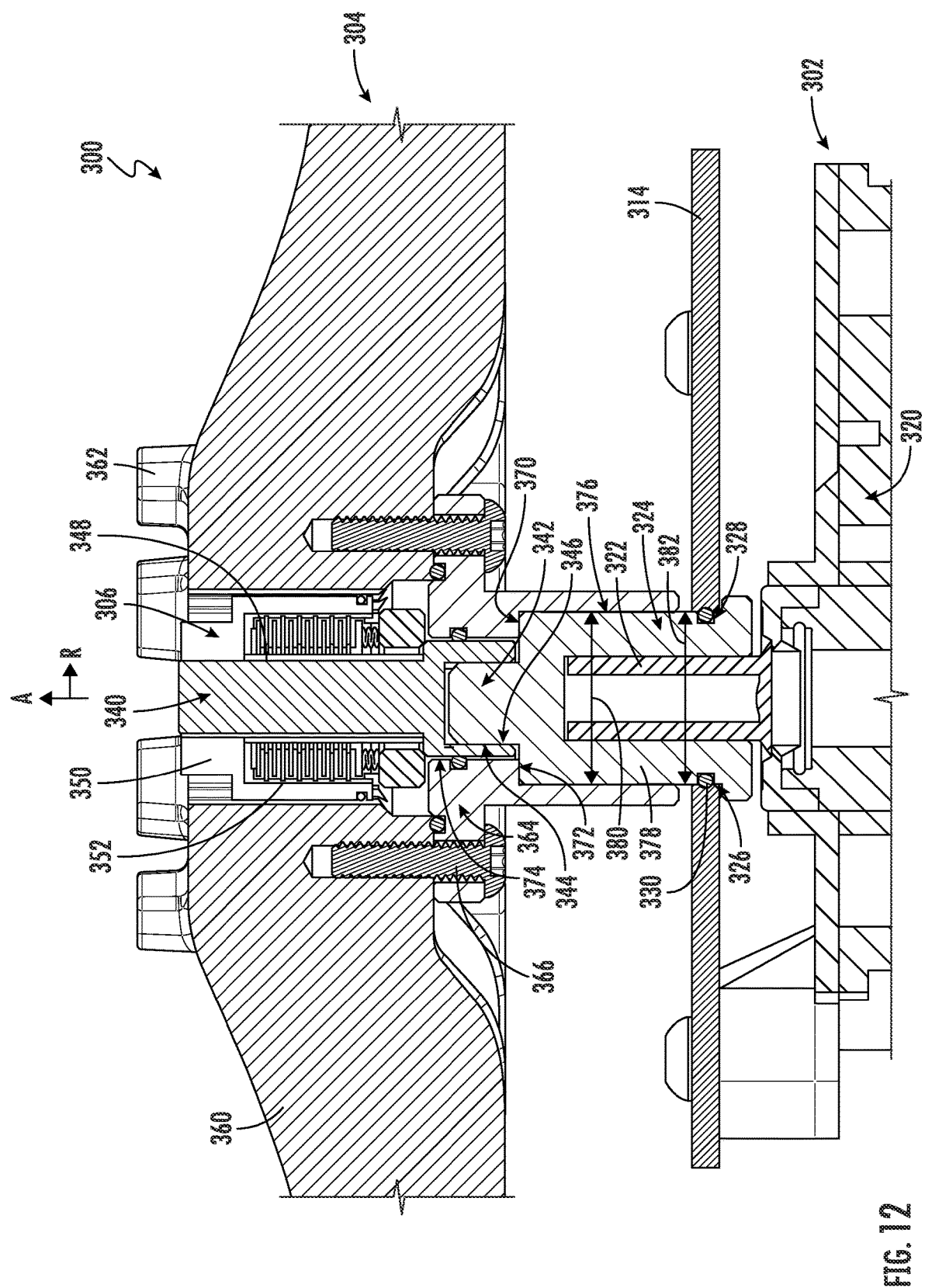
FIG. 12 provides cross sectional view of the exemplary grow module of FIG. 9 according to an exemplary embodiment of the present subject matter.

As illustrated, drive assembly 300 may generally include a motor assembly 302, a turntable assembly 304, and a clutch assembly 306. Each of these assemblies will be described in more detail below according to exemplary embodiments the present subject matter. As best shown in FIG. 9, turntable assembly 304 is rotatably mounted within an aperture 310 that is defined in a floor 312 that partially defines grow chamber 122. Turntable assembly 304 is also configured for receiving and/or supporting grow module 200. Gardening appliance 100 further includes sump 278 within which water runoff, excess nutrients, and other byproducts of the growing process may be collected. In this regard, for example, floor 312 and turntable assembly 304 may include one or more apertures or channels through which liquids and other debris may flow into sump 278 (e.g., for recirculation or disposal). As best shown in FIG. 12, sump 278 may be defined at least partially below floor 312, and motor assembly 302 may be positioned at least partially below sump 278, and may be protected from liquids in sump 278 by a motor mounting plate or sump seal plate 314. It should be appreciated the gardening appliance 100 may include additional features for isolating or sealing motor assembly 302 to protect it from liquid collected within sump 278.

Figure 10:
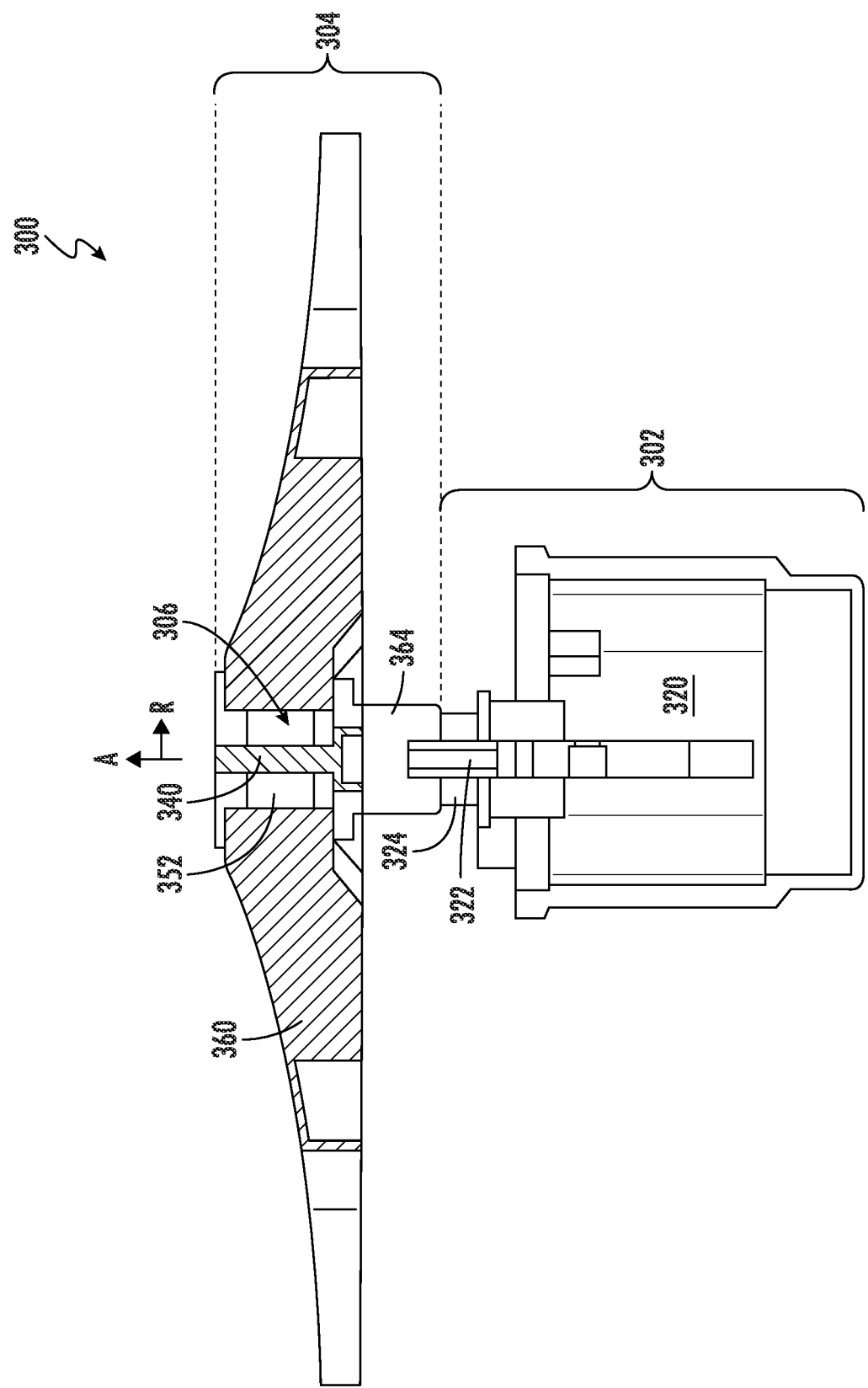
FIG. 10 provides a view of the exemplary grow module of FIG. 9 according to an exemplary embodiment of the present subject matter.
Figure 11:
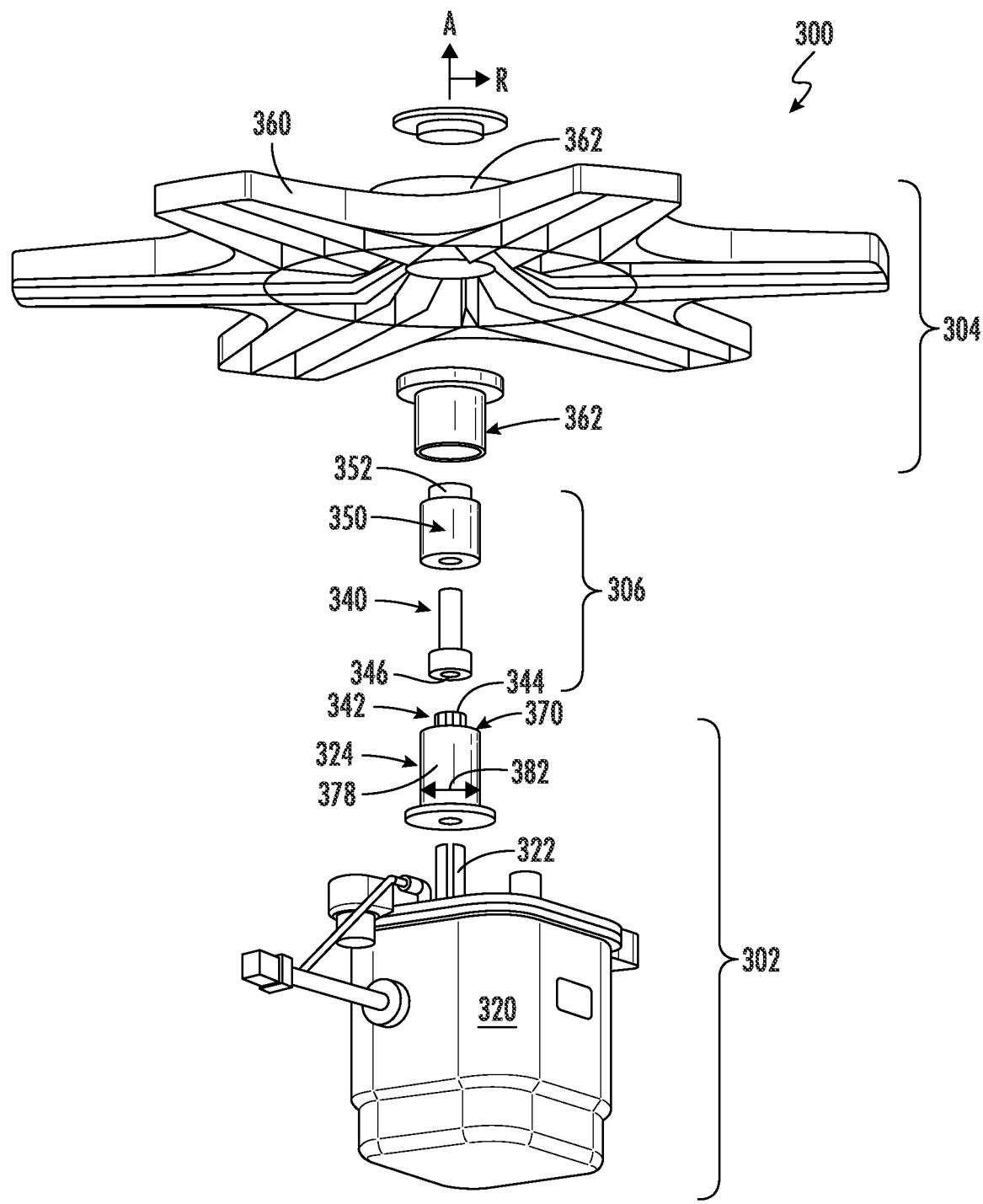
FIG. 11 provides an exploded view of the exemplary grow module of FIG. 9 according to an exemplary embodiment of the present subject matter.

Referring now also to FIGS. 10 through 12, motor assembly 302 will be described in more detail. Notably, motor assembly 302 may be the same or similar to motor 230 described above. In this regard, motor assembly 302 may include any suitable drive motor and/or transmission assembly for rotating grow module 200. For example, motor assembly 302 may include a brushless DC electric motor, a stepper motor, or any other suitable type or configuration of motor. For example, motor assembly 302 may include an AC motor, an induction motor, a permanent magnet synchronous motor, or any other suitable type of AC motor. In addition, motor assembly 302 may include any suitable transmission assemblies, clutch mechanisms, or other components. According to exemplary embodiments, motor assembly 302 is capable of bi-directional rotation, e.g., such that it may rotate grow module 200 in the clockwise and counterclockwise directions.

Specifically, as illustrated, motor assembly 302 includes a drive motor 320 that selectively rotates a motor shaft 322. In this regard, motor shaft 322 may define an axial direction A corresponding to the axis of rotation of drive motor 320 and a radial direction R that extends perpendicular to the axial direction A. Furthermore, according to the exemplary embodiment, motor assembly 302 may include a shaft cap 324 that is rotatably fixed to motor shaft 322 and may generally define a geometry suitable for engaging clutch assembly 306 and/or turntable assembly 304 as will be described in more detail below. According to exemplary embodiments, shaft cap 324 may be integrally formed as part of motor shaft 322, or motor shaft 322 may be entirely replaced by shaft cap 324. As best shown in FIG. 12, shaft cap 324 may pass through an aperture 326 in sump seal plate 314 and may have a groove 328 for receiving and O-ring seal 330 to form a fluid seal between shaft cap 324 and the sump seal plate 314. In this manner, drive motor 320 may be generally protected from fluid within sump 278.

Referring generally to FIGS. 10 through 12, shaft cap 324 may be mechanically coupled to a clutch assembly 306 and/or turntable assembly 304 for providing drive torque to facilitate rotational motion of grow module 200 and vertical support for supporting the weight of grow module 200, plants 124, etc. Specifically, clutch assembly 306 may have a clutch input 340 that is generally configured for engaging shaft cap 324 to transfer torque from drive motor 320 to clutch assembly 306. More specifically, as illustrated, shaft cap 324 may define a drive pin 342 at a distal end relative to drive motor 320. Drive pin 342 may define a keyed structure 344, such as a spline, a geared arrangement, or another keyed feature on its radially outer surface. Similarly, clutch input 340 may define a complementary structure 346 that is configured for engaging keyed structure 344 of drive pin 342 to rotatably couple clutch input 340 to shaft cap 324. In general, keyed structure 344 and complementary structure 346 may be any suitable features or geometry that provide suitable engagement between clutch input 340 and shaft cap 324. According to exemplary embodiments, clutch input 340 may be formed integrally as part of clutch assembly 306. According to alternative embodiments, clutch input 340 may be a separate component.

As best shown in FIG. 12, clutch assembly 306 may further include an inner shaft 348 that is attached and rotatably fixed to clutch input 340 and an outer shaft 350 that is fixed to turntable assembly 304. Notably, clutch assembly 306 may include an internal clutch mechanism 352 that is generally configured for transmitting torque from drive motor 320 to turntable assembly 304. However, clutch mechanism 352 may have a torque slip threshold beyond which clutch assembly 306 disengages motor assembly 302 from turntable assembly 304. This torque slip threshold may be any suitable torque selected for any suitable purpose, e.g., as a safety measure or to protect plants 124. For example, the torque slip threshold may be selected to ensure safe operation and rotation of grow module 200. In this regard, the torque slip threshold may be selected to prevent harm to a user and prevent pinch points, e.g., between grow module 200 and liner 120.

Referring still to FIGS. 10 through 12, turntable assembly 304 generally includes a hub 360 that is configured for receiving grow module 200. In this regard, hub 360 may include a plurality of radial arms and one or more receiving features 362 for engaging and/or securing grow module 200. It should be appreciated that grow module 200 may further be attached to hub 304 and any other suitable manner, e.g., via mechanical fasteners. In addition, according to exemplary embodiments, turntable assembly 304 may further include a hub support 364 that extends downward from a bottom of hub 360. Hub support 364 may be attached to hub 360 using one or more mechanical fasteners 366 and is generally configured for supporting the weight of turntable assembly 304 and grow module 200 during operation. Although hub 360 and hub support 364 are illustrated and described herein as being two separate pieces, it should be appreciated that hub support 364 may be integrally formed as part of the hub 360 according to alternative embodiments.

As best shown in FIG. 12, shaft cap 324 may generally define a support shoulder 370. In this regard, support shoulder 370 is a substantially flat, horizontal surface positioned at the base of drive pin 342 that may be particularly suited for supporting vertical loads. Hub support 364 may further define an inner flange 372 that is configured for being seated on or otherwise engaging support shoulder 370 when turntable assembly 304 is mounted to the motor assembly 302. Furthermore, hub support 364 may generally define an upper cylindrical void or channel 374 and a lower cylindrical void or channel 376. As shown, inner flange 372 may be defined between and join upper channel 374 and lower channel 376.

According to the illustrated embodiment, upper channel 374 is generally configured for receiving drive pin 342 and clutch input 340 in a concentric configuration. In this regard, drive pin 342 may be positioned within complementary structure 346 of clutch input 340, and clutch input 340 may be seated at least partially on support shoulder 370. In addition, drive pin 342 and complementary structure 346 may be positioned concentrically within upper channel 374 of hub support 364.

According to the illustrated embodiment, lower channel 376 may be configured for receiving shaft cap 324. In this regard, shaft cap 324 may include an outer cylinder 378 that is positioned within and lower channel 376. Outer cylinder 378 may form a tight fit with lower channel 376. More specifically, lower channel 376 may define a channel diameter 380 that is substantially equivalent to an outer diameter 382 of shaft cap 324. In this regard, outer cylinder 378 is securely received within lower channel 376 such that the entire moment load of turntable assembly 304 and grow module 200 is transferred to shaft cap 324. In other words, shaft cap 324 may be securely received within lower channel 376 such that there is little or no movement between the two.

Figure 13:
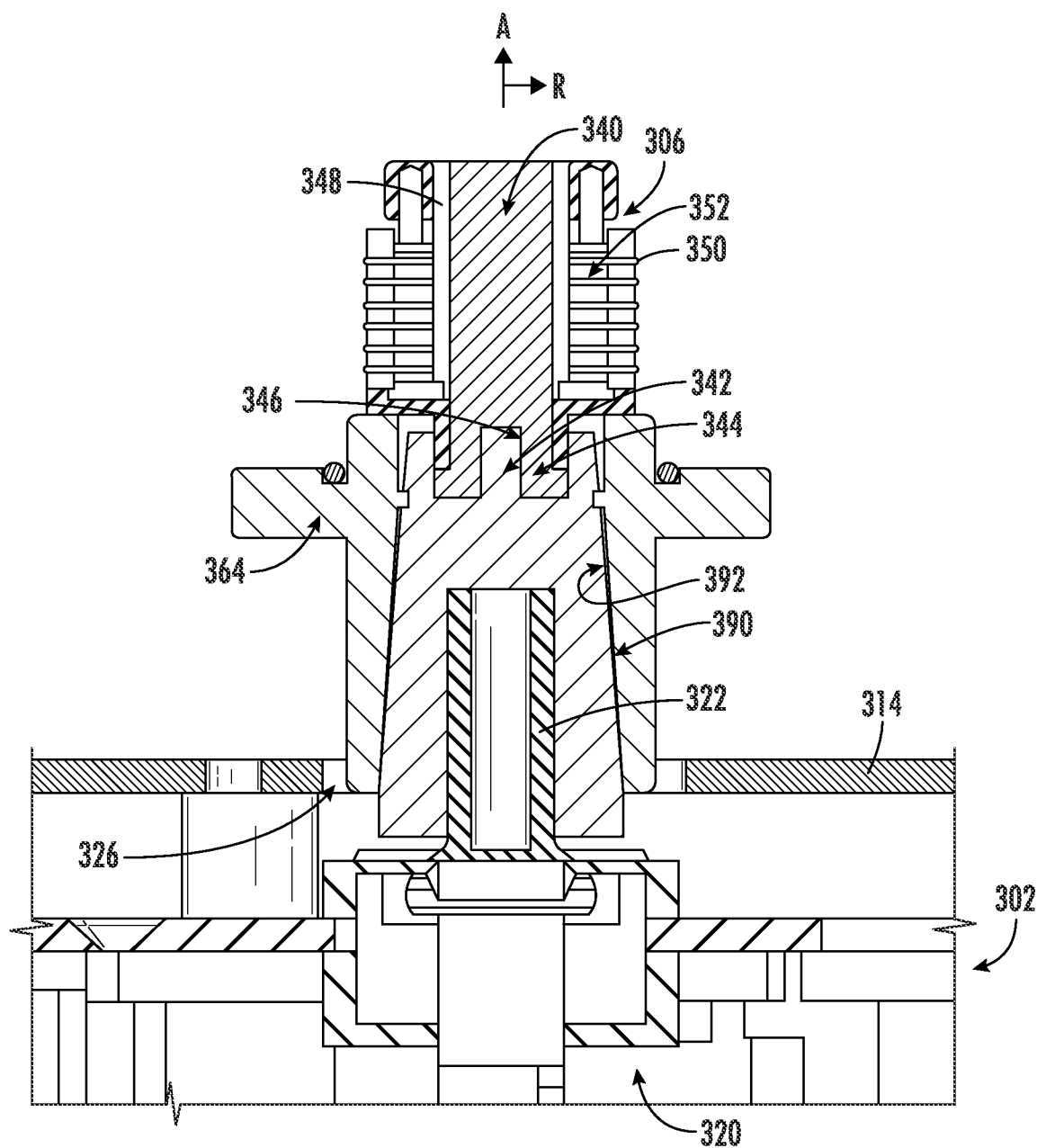
FIG. 13 provides cross sectional view of the exemplary grow module of FIG. 9 according to another exemplary embodiment of the present subject matter.

Referring now briefly to FIG. 13, another support structure is illustrated according to an exemplary embodiment of the present subject matter. Specifically, as shown, instead of having a support shoulder and flange configuration, shaft cap 324 and hub support 364 may be engaged through a tapered interface. In this regard, shaft cap 324 may define an outer tapered surface 390 and hub support 364 may define an inner tapered surface 392 that is generally configured for engaging outer tapered surface 390. Thus, when hub support 364 is installed on shaft cap 324, tapered surfaces 390, 392 may center hub support 364 along the axial direction A and provide vertical support to hub support 364 and turntable assembly 304. It should be appreciated that other support surfaces are possible and within the scope of the present subject matter.

It should be appreciated that according to the embodiment of FIG. 13, hub support 364 may not define upper channel 372 and lower channel 376, but instead defines a single conical void that is complementary to the conical or tapered shape of shaft cap 324. However, the embodiment illustrated in FIG. 13 may otherwise be the same or similar to other embodiments described herein. Indeed, features of the various embodiments described herein may be interchangeable among embodiments to form still other embodiments of the present subject matter.

Notably, the drive assembly 300 described above provides an improved drive mechanism for rotating a grow module of a gardening appliance. In this regard, drive assembly 300 provides for efficient transmission of torque to facilitate bi-directional rotation of grow module 200 while providing a safety threshold to avoid dangerous conditions related to pinch points, e.g., using clutch assembly 306. In addition, the engagement between the hub support 364 and shaft cap 324 provides solid support structures for vertical loading and moment loading, e.g., tilting of grow module 200 that may occur when plants 124 are not equally balanced around the axial direction A. Moreover, it should be appreciated that drive assembly 300 may be fully disassembled, e.g., by removing motor assembly 302, turntable assembly 304, and/or clutch assembly 306 for cleaning and/or maintenance. Other advantages to such a system will be evident one having ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance, comprising:
    a liner positioned within a cabinet and defining a grow chamber;
    a grow module mounted within the liner and defining a plurality of apertures for receiving one or more plant pods; and
    a drive assembly for selectively rotating the grow module within the grow chamber, the drive assembly comprising:
        a turntable assembly configured for receiving the grow module, the turntable assembly comprising a hub configured for receiving the grow module and a hub support that extends downward from a bottom of the hub;
        a motor assembly comprising a drive motor for selectively rotating a motor shaft and a shaft cap rotatably fixed to the motor shaft, the shaft cap defining a support shoulder, the hub support being seated on the support shoulder of the shaft cap to support the grow module and the turntable assembly; and
        a clutch assembly mechanically coupling the motor assembly and the turntable assembly, the clutch assembly being mechanically coupled to the shaft cap and having a torque slip threshold beyond which the clutch assembly disengages the motor assembly from the turntable assembly, wherein the clutch assembly reengages the motor assembly and the turntable assembly below the torque slip threshold.

2. The gardening appliance of claim 1, wherein the shaft cap is integrally formed as part of the motor shaft.

3. The gardening appliance of claim 1, wherein the shaft cap comprises a drive pin defining a keyed structure, and wherein the clutch assembly comprises:
    a clutch input defining a complementary structure for engaging the keyed structure of the shaft cap to rotatably fix the clutch input to the shaft cap.

4. The gardening appliance of claim 3, wherein the clutch input is integrally formed as part of the clutch assembly.

5. The gardening appliance of claim 1, wherein the hub support is integrally formed as part of the hub.

6. The gardening appliance of claim 3, wherein the hub support defines an upper cylindrical channel for receiving the keyed structure of the shaft cap and the complementary structure of the clutch input in a concentric configuration.

7. The gardening appliance of claim 1, wherein the hub defines a clutch housing for receiving the clutch assembly, the clutch assembly comprising:
    an outer shaft that is rotatably coupled to the hub; and
    an inner shaft that is rotatably coupled to the clutch input.

8. The gardening appliance of claim 1, wherein the hub support defines a lower cylindrical channel for receiving the shaft cap.

9. The gardening appliance of claim 8, wherein a channel diameter of the lower cylindrical channel is substantially equivalent to an outer diameter of the shaft cap.

10. The gardening appliance of claim 1, wherein the shaft cap defines an outer tapered surface, and wherein the hub support defines an inner tapered surface that is seated against the outer tapered surface of the shaft cap to support the grow module and the turntable assembly.

11. The gardening appliance of claim 1, wherein the drive assembly is capable of bi-directional rotation.

12. The gardening appliance of claim 1, wherein the turntable assembly is positioned within a sump at a bottom of the gardening appliance.

13. A drive assembly for selectively rotating a grow module within a grow chamber of a gardening appliance, the drive assembly comprising:
    a turntable assembly configured for receiving the grow module, the turntable comprising a hub configured for receiving the grow module and a hub support that extends downward from a bottom of the hub;

a motor assembly comprising a drive motor for selectively rotating a motor shaft and a shaft cap rotatably fixed to the motor shaft, wherein the shaft cap defines an outer tapered surface, and wherein the hub support defines an inner tapered surface that is seated against the outer tapered surface of the shaft cap to support the grow module and the turntable assembly; and a clutch assembly mechanically coupling the motor assembly and the turntable assembly, the clutch assembly being mechanically coupled to the shaft cap and having a torque slip threshold beyond which the clutch assembly disengages the motor assembly from the turntable assembly, wherein the clutch assembly reengages the motor assembly and the turntable assembly below the torque slip threshold.

14. The drive assembly claim 13, wherein the shaft cap comprises a drive pin defining a keyed structure, and wherein the clutch assembly comprises:

a clutch input defining a complementary structure for engaging the keyed structure of the shaft cap to rotatably fix the clutch input to the shaft cap.

15. The drive assembly of claim 14, wherein the shaft cap defines a support shoulder, and wherein the hub support is seated on the support shoulder of the shaft cap to support the grow module and the turntable assembly.

16. The drive assembly of claim 15, wherein the hub support defines an upper cylindrical channel for receiving the keyed structure of the shaft cap and the complementary structure of the clutch input in a concentric configuration.

17. A drive assembly for selectively rotating a grow module within a grow chamber of a gardening appliance, the drive assembly comprising:

a motor assembly comprising a drive motor for selectively rotating a motor shaft and a shaft cap rotatably fixed to the motor shaft, the shaft cap defining a support shoulder;

a turntable assembly configured for receiving the grow module and comprising a hub configured for receiving the grow module and a hub support that extends downward from a bottom of the hub, the hub support being seated on the support shoulder of the shaft cap to support the grow module and the turntable assembly; and a clutch assembly mechanically coupling the motor assembly and the turntable assembly, the clutch assembly having a torque slip threshold beyond which the clutch assembly disengages the motor assembly from the turntable assembly, wherein the clutch assembly reengages the motor assembly and the turntable assembly below the torque slip threshold.

18. The drive assembly of claim 17, wherein the hub support defines an upper cylindrical channel for receiving a keyed structure of the shaft cap and a complementary structure of a clutch input in a concentric configuration.

* * * * *